Nov. 25, 1941.   A. J. KAMINSKY   2,264,135
TRACTOR ROAD PROTECTOR
Filed Oct. 24, 1940
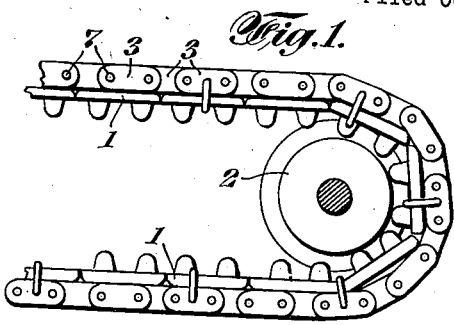
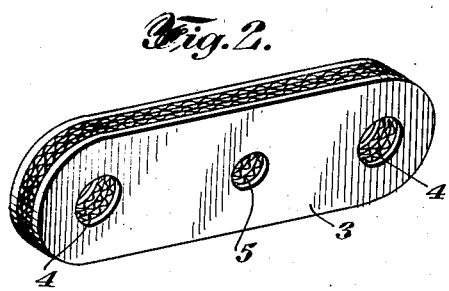
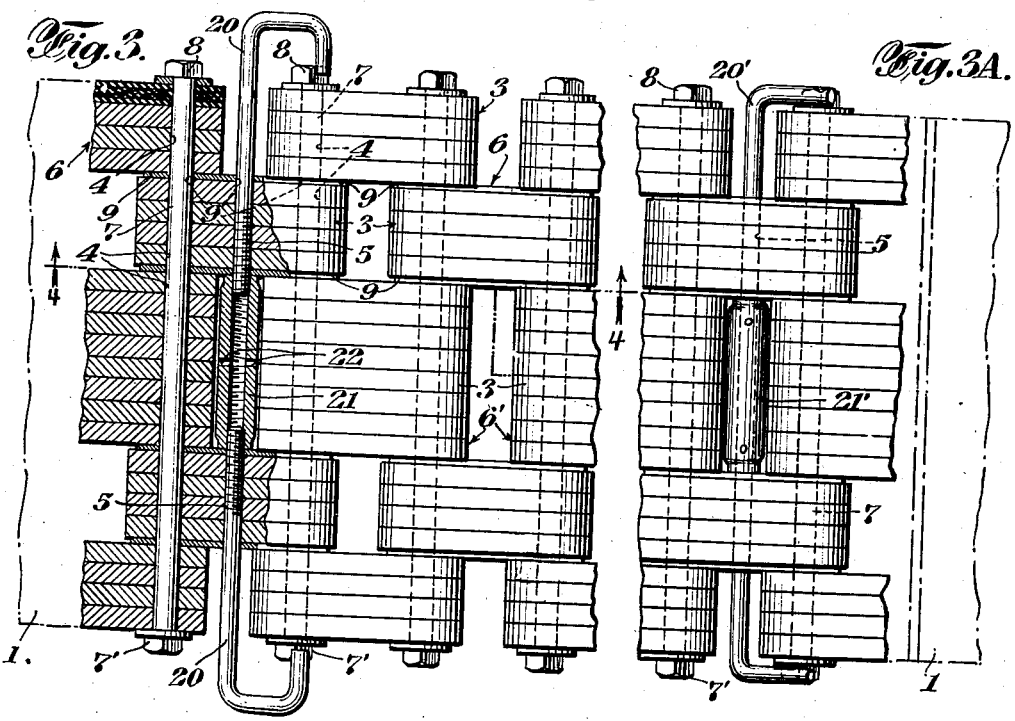
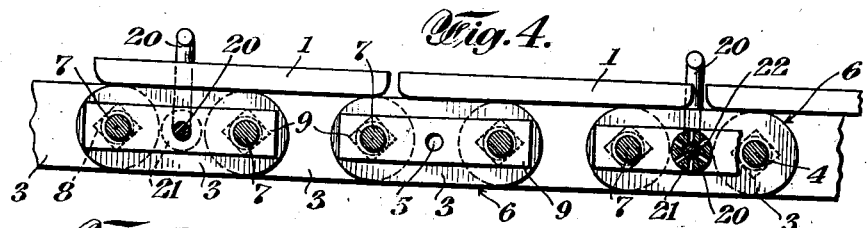
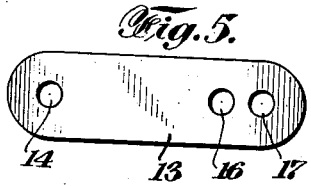
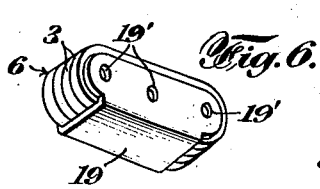
INVENTOR
Abraham J. Kaminsky
BY
ATTORNEY Patented Nov. 25, 1941

2,264,135

UNITED STATES PATENT OFFICE 2,264,135

TRACTOR ROAD PROTECTOR

Abraham J. Kaminsky, New York, N. Y.

Application October 24, 1940, Serial No. 362,486

12 Claims. (Cl. 305—10)

This invention relates to means for protecting roads and highways against the disastrous effects of the metal treads or metal wheel rims of tractors. The device of this invention, which may be referred to as a tractor road protector, may be applied to tractors which have either crawler type traction (an endless chain of metal plates or treads passing over and driven by a pair of sprockets) or wheel-tread type traction (a wheel formed of an endless circle of metal treads). The device may also be applied to tractors which have crawler traction in the form of an endless flexible belt or which have ordinary metal rimmed wheels.

Where the term "tractor" is used throughout this specification, it is used in a generic sense to cover a wide class of machines, including tractors, excavating machines, shovels, farm machines, trucks, tanks, military units, and similar machines and vehicles.

One of the objects of the invention is to provide a road protector for the various types of tractors mentioned, which may be applied to tractors having either plain treads (or wheel rims) or having cleated treads or rims. Another object is to provide a road protector which may be readily, quickly, and easily applied to a tractor. Allied to this object is the provision of a road protector which may be applied to, and removed from, a tractor in a single operation. Other objects are to provide a cheap and simple road protector which may be easily handled and stored and which shall be less costly than present means.

For the attainment of the above and such other objects as may hereinafter appear or be pointed out, I have shown preferred forms of my invention in the accompanying sheet of drawing, wherein:

Fig. 1 is an elevational view of one end of a tractor crawler to which is applied the road protector of this invention;

Fig. 2 is a perspective view of a "link-unit";

Fig. 3 is a plan view of a portion of the road protector; Fig. 3A is a similar view, showing a modified form of hook rod;

Fig. 4 is an elevational view taken on the line 4—4 of Fig. 3;

Fig. 5 is an elevational view of a modified form of "link-unit"; and

Fig. 6 is a perspective view of a modified form of "block-unit" part.

The invention is shown applied to a crawler type tractor having plain (i. e., without cleats) treads. It is understood, as pointed out above in the statement of invention, that the invention may be equally well applied to "wheeled" tractors having a metal rim or a plurality of separate, joined treads, or to wheel rims and treads implemented with cleats. The tractor treads are designated 1, see Figs. 1 and 4, and pass over, and are driven by, sprocket 2, Fig. 1. The road protector of this invention is formed from a large number of "link-units," 3, see Fig. 2, made from multi-ply rubber fabric. In one model of the road protector, the link-unit is formed from fabric rubber about ½" thick, the link-unit being about 5" long and about 2" high. The link-units have a small hole 4 near each end and a center hole 5.

A number of link-units are placed face-to-face to form a "block-unit," see Fig. 3. Merely for illustrative purposes, there is shown in Fig. 3 a block-unit 6, which is constituted of four link-units. It is evident that the road protector may be made from block-units having an equal number of link-units, which number may be more or less than the number shown in Fig. 3, and that the road-protector may be formed from more than two different block-units.

Through the end holes 4 of the individual link-units, Fig. 2 or rather, through the end holes 4 of a block-unit, is passed a through bolt 7, provided with a head 7' at one end and threaded at the other end for nut 8. The block-units are hinged or joined to each other in a staggered relation; for example, the bolt 7 at the left in Fig. 3 passes through the right-end hole of the top (as viewed in Fig. 3), center and bottom block-units and through the left-end hole of the alternate (second and fourth) block-units. The next bolt passes through the left-end hole of the top, center and bottom block-units and through the right-end hole of the alternate ones.

The alternate block-units, viz., the second and fourth block-units as viewed in Fig. 3, are provided with metal links 9 having holes 9' corresponding to, and alignable with, the holes 4 and 5, Fig. 2, of the link-units. The metal links 9 thus separate adjoining block-units, see Fig. 3.

The road protector is made in a width corresponding to the width of the crawler tread or wheel tread or width of the wheel rim, and in lengths corresponding to the perimetric length of the crawler or circumference of the wheel. It is apparent that the ends of the length of road protector comprise a number of block-units which, when brought together, inter-mesh with each other and thus align the left-end holes of the block-units at one end with the right-end holes at the other end. A through bolt 7 is then passed through the aligned holes and tightened with a nut to unite the ends of the protector into an endless array of articulated block-units.

In the particular model of link-units described above with reference to Fig. 2, the end bolt holes 4 are spaced at 3" centers. The road protector would thus be formed of block-units articulated at 3" centers. This model would fit tractors having a perimetric or circumferential distance which is a multiple of 3 or where a variation of 3" in the entire length would be tolerable. Where it is desired to work to a tolerance closer than 3", one set of over-sized link-units (or, rather, block-units) may be provided. For example, it may be necessary to work to a closer tolerance of 1". For this purpose there is provided extra link-units 13, see Fig. 5, having a single hole 14 at one end and a pair of holes 16 and 17 at the other end. The center distance between holes 14 and 16 and 14 and 17 is, respectively, 4" and 5". There is thus made available center distances of 3" (using ordinary link-units 3), 4" and 5" (using a set of extra link-units 13).

It is necessary to provide means to maintain the road-protector on the crawler or wheel of the tractor, i. e., against sidewise movement. The center holes 5 of the link-units, Fig. 2, are provided for this purpose. Through the aligned center holes 5 of the block-units, see Fig. 3, more particularly, of the alternate series of block-units which does not include the end block-units, is passed from each end, a rod 20 having a hook at each end. The other or facing ends of the rods are threaded to be screwed into a turnbuckle 21, tapped for the rod threads. As clearly seen in Fig. 3, turnbuckle 21 is placed in the space between a pair of center block-units, and one of the pair of rods passed through the center hole of the block-unit (or units, if more than five block-units are provided across the width of the protector) on one side and threaded into the turnbuckle; the other rod is passed through the block-unit (or units) on the other side and threaded into the other end of the turnbuckle.

The turnbuckle is provided with a plurality of radial holes 22, see also Fig. 4, in which may be received the end of a pin rod or tool (not shown) which is used for tightening up the pair of hook rods 20, 20. The hook rods 20, 20, with their turnbuckle 21 are placed at spaced points along the length of the road protector. After the road protector is placed on the crawler or wheels and the ends bolted together to form an endless array of articulated block-units, a number of sets of hook rods are applied, to hold the road protector firmly on the crawler or wheel and to prevent side movement thereof. The hook rods are screwed into the turnbuckle by turning the rods by hand until such turning is prevented by the hooked ends of the rods striking the end block-units. Thereafter, the turnbuckle is turned by the afore-described pin rod; the rods and the turnbuckle are threaded and tapped, respectively, left and right hand.

Fig. 3 is a plan view taken from the top of a crawler, i. e., the crawler treads, 1, underlie the road protector block-units. The hook ends of the rods 20 are turned inwardly (or downwardly into the paper, Fig. 3) and must be kept from turning outwardly or beyond the tractor treads or wheel rim. If this should occur there would exist the possibility that the hooked ends of the rods would be caught between the treads or wheel and the ground. However, the nuts 8 and the bolt heads 7 at the other end of the bolts, prevent the hooked rods from turning outwardly; i. e., the nuts maintain the hooked ends turned in an inwardly direction, away from the treads or wheel rim and the ground.

The rods 20', Fig. 3A, have a normally-directed projection rather than a hook. Instead of a turnbuckle into which the rods may be screwed, rod 20' is one integral length of rod, the ends of which are bent as shown. A sleeve 21' is placed in the space between the center block-units and the rod permanently pinned thereto. The rod 20' fits rather tightly through the center holes 5 of the link-units and the sleeve 21' fits rather tightly between the block-units. There is thus created sufficient friction to cause the rod to be held to any position to which it is turned, either with its normal projection parallel to the links or turned inwardly, to hold the protector in place.

The metal links, 9, see Fig. 3, on each side of a block-unit may be made in the form of an integral channel or cradle, 19, as shown in Fig. 6, and provided with holes 19' corresponding to end holes 4 and center holes 5 of the link-units.

I claim:

1. A road protector for a tractor having traction means of a pre-determined width and perimetric length, comprising a plurality of link-units formed from multi-ply fabric rubber and provided with a pair of end holes and a center hole, the said link-units being placed face to face, with their said holes in alignment, to form a lesser plurality of block-units, the said block-units being arranged in a number of rows depending upon the said traction width, each row comprising a plurality of block-units depending upon the said perimetric length, alternate rows being arranged in staggered relation with the right-end holes of block-units of odd-numbered rows aligned with the left-end holes of block-units of the alternate even-numbered rows, bolts passed through the aligned end holes of the block-units to form a length of articulated block-units, the said articulated length being adapted to cover the said traction means and formed into an endless chain by a closing bolt, a plurality of pairs of hook-ended rods, each pair comprising a right-threaded and a left-threaded rod, a plurality of turnbuckles tapped for right-and-left threads and provided with spaced radial pin holes adapted to receive a pin-tool, the said pairs of rods being passed through the aligned center holes of the block-units at spaced points and screwed into the said turnbuckles, the nuts and heads of the said plurality of bolts being adapted to maintain the hooked ends of the rods directed inwardly and away from the pavement side of the block-units.

2. A road protector for a tractor having traction means of a pre-determined width and perimetric length, comprising a plurality of link-units formed from multi-ply fabric rubber and provided with a pair of end holes and a center hole, the said link-units being placed face to face, with their said holes in alignment, to form a lesser plurality of block-units, the said block-units being arranged in a number of rows depending upon the said traction width, each row comprising a plurality of block-units depending upon the said perimetric length, alternate rows being arranged in staggered relation with the right-end holes of block-units of odd-numbered rows aligned with the left-end holes of block-units of the alternate even-numbered rows, bolts passed through the aligned end holes of the block-units to form a length of articulated block-units, the said articulated length being adapted to cover the said traction means and formed into an endless chain by a closing bolt, a plurality of pairs of hook-ended rods, each pair comprising a right-threaded and a left-threaded rod, a plurality of turnbuckles tapped for right-and-left threads and provided with spaced radial pin holes adapted to receive a pin-tool, the said pairs of rods being passed through the aligned center holes of the block-units at spaced points and screwed into the said turnbuckles.

3. A road protector for a tractor having traction means of a pre-determined width and perimetric length, comprising a plurality of link-units formed from multi-ply fabric rubber and provided with a pair of end holes and a center hole, the said link-units being placed face to face, with their said holes in alignment, to form a lesser plurality of block-units, the said block-units being arranged in a number of rows depending upon the said traction width, each row comprising a plurality of block-units depending upon the said perimetric length, alternate rows being arranged in staggered relation with the right-end holes of block-units of odd-numbered rows aligned with the left-end holes of block-units of the alternate even-numbered rows, bolts passed through the aligned end holes of the block units to form a length of articulated block-units, the said articulated length being adapted to cover the said traction means and formed into an endless chain by a closing bolt, a plurality of pairs of rods, each pair comprising a right-threaded and a left-threaded rod, a plurality of turnbuckles tapped for right-and-left threads and provided with spaced radial pin holes adapted to receive a pin-tool, the said pairs of rods being passed through the aligned center holes of the block units at spaced points and screwed into the said turnbuckles.

4. The combination according to claim 3 wherein an odd number of rows are provided and wherein the center row is comprised of block-units formed of a greater number of link-units than the other rows, whereby increased width is provided for receiving the said turnbuckles.

5. The combination according to claim 3 wherein the said rods are passed through the aligned center holes of the alternate series of block-units which do not include the end block-units.

6. A road protector for a tractor having traction means of a pre-determined width and perimetric length, comprising a plurality of link-units formed from multi-ply fabric rubber and provided with a pair of end holes and a center hole, the said link-units being placed face to face, with their said holes in alignment, to form a lesser plurality of block-units, the said block-units being arranged in a number of rows depending upon the said traction width, each row comprising a plurality of block-units depending upon the said perimetric length, alternate rows being arranged in staggered relation with the right-end holes of block-units of odd-numbered rows aligned with the left-end holes of block-units of the alternate even-numbered rows, bolts passed through the aligned end holes of the block units to form a length of articulated block-units, the said articulated length being adapted to cover the said traction means and formed into an endless chain by a closing bolt, and means associated with the said center holes of the link-units for attaching the road protector.

7. The combination according to claim 6, wherein the said link-units are of a pre-determined length between end-holes, further provided with a number of extra block-units formed of link-units having a different length between end-holes.

8. The combination according to claim 6 further provided with a number of extra block-units formed of link-units having a hole at one end and a plurality of holes at the other end.

9. The combination according to claim 6 wherein the said link-units have a center-distance of 3" between end-holes, further provided with a plurality of extra block-units formed of link-units having a single hole at one end and two holes at the other end providing a center-distance of 4" and a center-distance of 5".

10. The combination according to claim 6 further provided with metal links between adjoining block-units, the said links being provided with holes corresponding to the said holes of the link-units.

11. The combination according to claim 6 further provided with cradles in which are fitted alternate block-units across the width of the road protector, the sides of the cradles being provided with holes corresponding to the said holes of the link-units.

12. The combination according to claim 6 further provided with a plurality of rods the ends of which are bent into normally directed portions and a plurality of sleeves to which the said rods are secured, the said rods being passed through the aligned center holes of the block-units at spaced points and their said sleeves received in the space between block-units.

ABRAHAM J. KAMINSKY.